Patented Nov. 21, 1922.

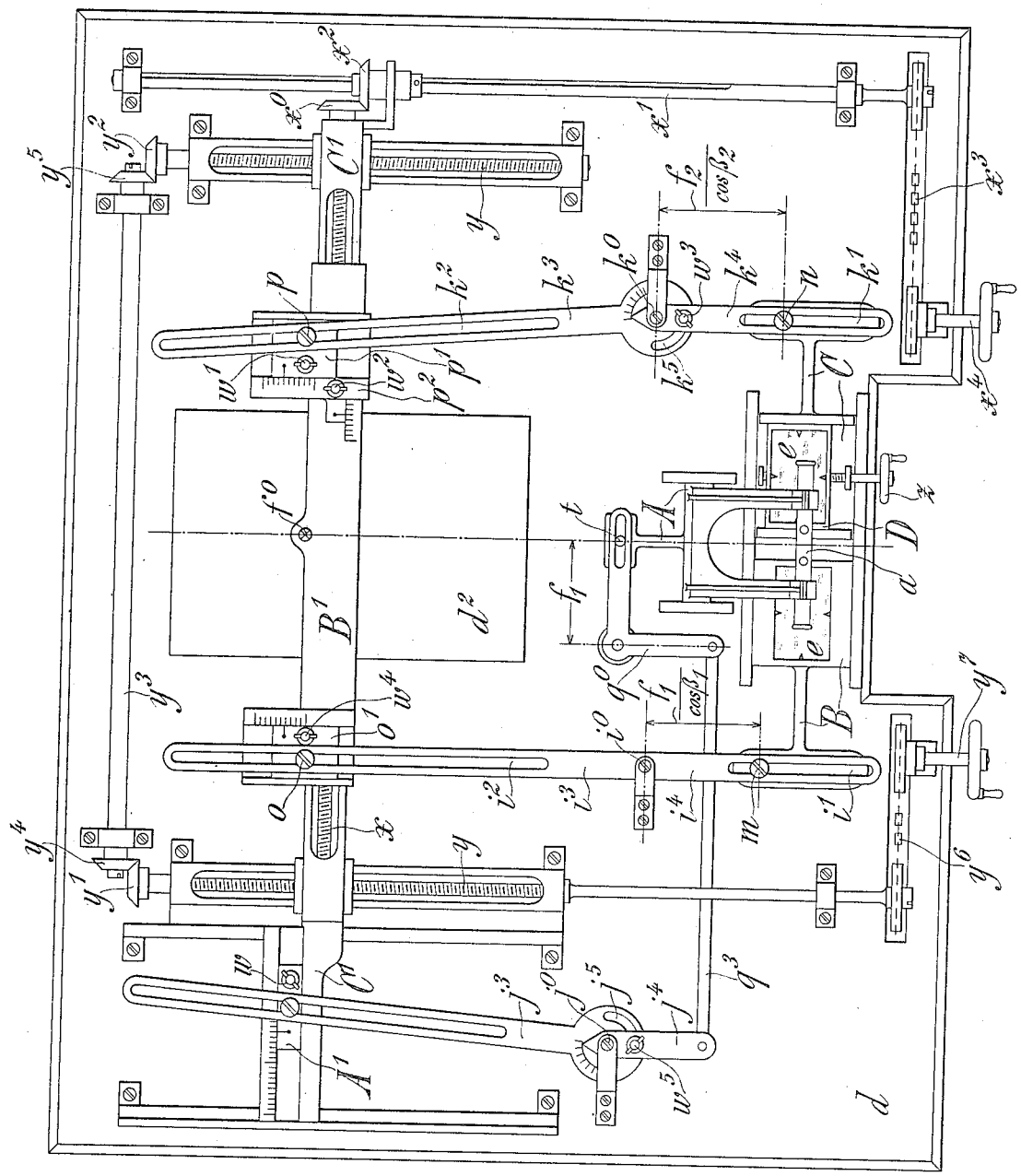

1,435,983

UNITED STATES PATENT OFFICE.

WILLY SANDER, OF JENA, GERMANY, ASSIGNOR TO THE FIRM OF CARL ZEISS, OF JENA, GERMANY.

STEREOISOHYPSOGRAPH.

Application filed December 2, 1920. Serial No. 427,866.

*To all whom it may concern:*

Be it known that I, WILLY SANDER, a citizen of the German Empire, residing at Jena, Germany, have invented a new and useful Stereoisohypsograph, of which the following is a specification.

The present invention relates to a device which permits of copying on a plane surface the surface of a spatial image to be obtained from a photostereogram, and in particular, elements of this surface designated height-lines, and which device is equipped for this purpose with a comparator system comprising a binocular double microscope with two marks, yielding a stereoscopic mark-image, and a slide system, and which is positively connected with a copying system, consisting of a spatial cross-slide system carrying the tool, in such a way that the position of the tool-point relatively to the copy-carrier corresponds at any one time to the position of that point of the object-surface, the images of which are seen in the comparator system as coinciding with its two marks.

Such devices are already known so far as the utilization of a photostereogram is concerned, at the taking of which the axes of the objectives were horizontal. In these known devices the slide system of the comparator system comprises four slides. Two of the latter serve for effecting a relative displacement of the microscope and the photograms in the height-direction of the photograms, whilst the two others adjust the relative displacement of the photograms and the microscope in the breadth-direction of the photograms.

The cross-slide system contains three slides, the one of which is displaceable on a fixed base-plate in the depth-direction of the copy-carrier, whilst the two others are displaceable beside each other on the said first slide in the breadth-direction of the copy-carrier. The cross-slide system is coupled to the comparator system by means of three levers.

According to the present invention the aforesaid coupling is so devised that the device also admits of copying height-lines if, on taking the photostereogram from which the height-lines are to be taken, the objective-axes were inclined to the vertical or horizontal.

The annexed drawing shows a constructional form in plan of a device corresponding to the present invention for copying height-lines on a drawing surface.

On a base-plate $d$ there is displaceably disposed a slide A, carrying a binocular double microscope $a$, the base-line of which is perpendicular to the direction of displacement of the slide A and which contains a mark in each of its two image-planes. The microscope $a$ serves for the stereoscopic observation of two photograms $c$, the one of which resting upon a slide B which is displaceable on the base-plate $d$ parallelly to the base-line of the microscope $a$, whilst the other one is carried by a cross-slide system which contains on the one hand a slide C which is displaceable on the base-plate $d$ along the same guide as the slide B, and which contains on the other hand a slide D which is adjustable on the slide C by means of a hand-wheel $z$ in the direction of displacement of the slide A.

The base-plate $d$ carries in addition a cross-slide system comprising three slides $A^1$, $B^1$ and $C^1$. The slide $C^1$ is displaceably disposed on the base-plate $d$ in the direction of displacement of the slide A. The slides $A^1$ and $B^1$ are displaceable on the slide $C^1$ in the same direction as the slides B and C on the base-plate. The slide $A^1$ can be fixed on the slide $C^1$ by means of a set screw $w$. The position adjusted at any one time can be read off on an indicating device. The slide $B^1$ is displaceable by means of a screw-spindle $x$ which is actuated from a grooved shaft $x^1$ by a bevel wheel $x^0$ and a bevel wheel $x^2$, displaceable along the said grooved shaft $x^1$ and coupled to the slide $C^1$ by means of a driver. The shaft $x^1$ is actuated by a hand-wheel $x^4$ accessible to the right hand of the observer, the motions of this hand-wheel being transmitted to the shaft $x^1$ by a chain drive $x^3$. The slide $B^1$ carries a drawing pencil $f^0$; the appertaining drawing board $d^2$ is fastened on the base-plate $d$. The slide $C^1$ is displaced by two screw spindles $y$, the left one of which is actuated by a hand-wheel $y^7$, disposed on the left side of the observer and coupled to this spindle by means of a chain drive $y^6$, whilst the right one is actuated from the left spindle by two pairs of bevel wheels $y^1$, $y^4$ and $y^2$, $y^5$ as well as a shaft $y^3$.

For transmitting the motions of the slide

A to the cross-slide system $A^1$, $B^1$, $C^1$ there serves a double lever which is rotatably supported on the base-plate $d$ about an axis $j^0$ and the two arms $j^3$ and $j^4$ of which are adjustable relatively to each other. For the purpose of adjustment the arm $j^3$ is provided with an arc-guide $j^5$ along which the arm $j^4$ is movable. The clamping is effected by a screw $w^5$. Whilst the arm $j^3$ of the double lever $j^3$, $j^4$ acts on a stud of the slide $A^1$ by means of a slit, the arm $j^4$ is jointedly connected by a rod $q^3$ with a cranked lever $q^0$ which is rotatably supported on the base-plate $d$ and both arms of which embrace a right angle. The axis of rotation of this cranked lever lies with the axis of rotation $j^0$ of the double lever $j^3$, $j^4$ in a plane which stands perpendicularly to the direction of displacement of the slide $C^1$. Besides, the arm of the cranked lever acting from the rod $q^3$ is parallel to the lever-arm $j^4$. The other arm of the cranked lever acts by means of a slit on a stud $t$ of the slide A which is assumed to be adjustable on the slide A in the direction of displacement of the slide B.

The slide B is coupled to the cross-slide system $A^1$, $B^1$, $C^1$ by means of a double lever $i^3$, $i^4$ rotatably supported on the base-plate $d$ about an axis $i^0$. The arm $i^4$ of the double lever acts by means of a slit $i^1$ on a stud $m$ of the slide B which is assumed to be adjustable on this slide in the direction of displacement of the slide A. The other arm $i^3$ of the double lever acts by means of a slit $i^2$ on the stud $o$ of a slide $o^1$ which is adjustably disposed on the slide $B^1$ in the direction of displacement of the slide $C^1$. A set screw $w^4$ serves for fixing the slide $o^1$ on the slide $B^1$. The slide $o^1$ is in its zero position when the components of the distances of the stud $o$, falling into the direction of displacement of the slide $C^1$, from the axis of rotation $i^0$ and the stud on the slide $A^1$ from the axis of rotation $j^0$ are alike.

The coupling of the slide C with the cross-slide system $A^1$, $B^1$, $C^1$ is effected by a double lever $k^3$, $k^4$, rotatably supported on the base-plate $d$ about an axis $k^0$ which lies with the axis of rotation $i^0$ in a plane parallel to the direction of displacement of the slide B. The two arms $k^3$ and $k^4$ of the double lever $k^3$, $k^4$ are adjustable relatively to each other, for which purpose the arm $k^3$ is provided with an arc-guide $k^5$ along which the arm $k^4$ is movable. The fixing is effected by means of a screw $w^3$. The arm $k^4$ acts by means of a slit $k^1$ on a stud $n$ of the slide C which is assumed to be adjustable on this slide in the direction of displacement of the slide A. The other arm $k^3$ acts by means of a slit $k^2$ on a stud $p$. This stud is disposed upon the upper slide $p^1$, adjustable in the direction of displacement of the slide $C^1$, of a cross-slide system, the lower slide $p^2$ of which is adjustable on the slide $B^1$ in the direction of displacement of the latter. A set screw $w^1$ serves for fixing the slide $p^1$ on the slide $p^2$ and by means of a set screw $w^2$ the slide $p^2$ may be fixed on the slide $B^1$.

In order to be able to trace a height-line representing the ground plan projection of a height-layer, the height of which above the left-hand objective has the value Y, the device must be adjusted in the following manner. The component of the distance of the stud $m$ from the axis of rotation $i^0$, lying in the direction of displacement of the slide A, has the value $\frac{f^1}{\cos \beta_1}$. The corresponding component of the distance of the stud $n$ from the axis of rotation $k^0$ has the value $\frac{f^2}{\cos \beta_2}$. The component of the distance of the stud $t$ from the axis of rotation of the cranked lever $q^0$, lying in the direction of displacement of the slide B, has the value $f^1$. The arms $j^3$ and $j^4$ of the double lever $j^3$, $j^4$ are adjusted relatively to each other in such a way that, when reckoned clockwise from the arm $j^3$, they embrace the angle $180-\beta_1$, and the arms $k^3$ and $k^4$ of the double lever $k^3$, $k^4$ in such a way that, when reckoned clockwise from the arm $k^3$, they embrace the angle $180+\gamma$. The slide $A^1$ is displaced from its zero-position in which the arm $j^3$ is parallel to the direction of displacement of the slide $C^1$ by the value Y, measured by the copying scale. The displacement of the slide $o^1$ from its zero-position, when measured by the copying scale, has the value $Y \tan \beta_1$. The slide $p^1$ is displaced from its zero-position in which, at a simultaneous zero-position of the slide $o^1$, the studs $p$ and $o$ lie in a plane falling into the direction of displacement of the slide $B^1$, when measured by the copying scale, by the value $Y \tan \beta_2 \cos \gamma + b (\sin \alpha \cos \epsilon - \tan \beta_2 \cos \gamma \sin \epsilon)$, whilst the displacement of the slide $p^2$ from its zero-position in which, at a simultaneous zero-position of the slides $p^1$ and $o^1$, the arms $i^1$ and $k^3$ are parallel to each other, has the value $Y \tan \beta_2 \sin \gamma + b (\cos \alpha \cos \epsilon - \tan \beta_2 \sin \gamma \sin \epsilon)$, measured by the copying scale.

In that case the following lettering has been adopted:

$b$ : connecting line of the objectives (base line), $f_1$ : focal length of the left-hand objective, $f_2$ : focal length of the right-hand objective, $\alpha$ : angle of inclination of the horizontal projection of the left-hand objective axis relatively to that perpendicular to the base line which lies in the horizontal plane, $\beta_1$ : angle of inclination of the left-hand objective axis relatively to the horizontal plane, $\beta_2$ : angle of inclination of the right-hand objective axis relatively to the horizontal plane, $\gamma$ : angle of inclination of the horizontal projections of the two objective axes relatively to one another, $\epsilon$ : angle of inclination of the base line relatively to the horizontal plane.

In order to use the device the observer looking into the double microscope $a$ must actuate the hand wheels $x^4$, $y^7$ and $z$ in such a way that the stereoscopic mark-image is guided along the stereoscopic object-image. In that case the drawing pencil $f^0$ traces on the drawing board $d^2$ the height-line corresponding to the height Y adjusted on the indicating device of the slide $A^1$.

I claim:

In a device for copying from a stereoscopic pair of photograms of an object of three dimensions onto a plane surface the combination of a stereo-comparator comprising four interdependent slides, A, B, C and D, a drawing device comprising three interdependent slides, $A^1$, $B^1$ and $C^1$ of which slides $A^1$ and $B^1$ are carried by $C^1$ adjacent to each other, the direction of displacement of slide $A^1$ coinciding with the direction of displacement of slide $B^1$, means comprising three levers for positively coupling the slides A, B and C with those of the said drawing device, by one of which levers the slide A is coupled to the drawing device, this lever having two arms adjustable relatively to one another in its plane of rotation, while by the other two levers the slides B and C are coupled to the drawing device, each of these levers having its point of application displaceable in the direction of displacement of $C^1$, relatively to that slide of the drawing device, which contains the said point, and one of these two levers having two arms adjustable relatively to one another in its plane of rotation and having its point of application displaceable still in the direction of displacement of slides $A^1$ and $B^1$, relatively to that slide of the drawing device, which contains the said point, and a system of actuating devices controlling the said stereo-comparator and the said drawing device, the said system being accessible to the operator while he is looking into the stereo-comparator.

WILLY SANDER.

Witnesses:
PAUL KRÜGEL,
FRITZ LANDER.